United States Patent [19]
Mourgeon

[11] Patent Number: 4,653,456
[45] Date of Patent: Mar. 31, 1987

[54] DEVICE FOR HEATING THE FUEL FOR DIESEL ENGINES

[75] Inventor: Jean C. Mourgeon, Ferriere, France

[73] Assignee: Mourgeon Industrie et Engineering S.A., France

[21] Appl. No.: 777,662

[22] Filed: Sep. 19, 1985

[30] Foreign Application Priority Data

Oct. 3, 1984 [FR] France ................. 8415170

[51] Int. Cl.⁴ .................. F02M 31/12; F28F 9/26
[52] U.S. Cl. .................... 123/557; 123/549; 165/143
[58] Field of Search ............ 123/557, 549, 545, 546; 165/143

[56] References Cited

U.S. PATENT DOCUMENTS

| | | |
|---|---|---|
| 1,574,675 | 2/1926 | Mc Kean . |
| 1,794,692 | 3/1931 | Hyde ................................ 165/143 |
| 2,658,729 | 11/1953 | Horwitz . |
| 3,171,478 | 3/1965 | Weiks ................................ 165/143 |
| 4,218,999 | 8/1980 | Shearer . |
| 4,338,906 | 7/1982 | Cox .................................. 123/545 |
| 4,512,324 | 4/1985 | Neary ............................... 123/557 |
| 4,516,556 | 5/1985 | Meyer ............................... 123/557 |
| 4,519,358 | 5/1985 | Redele ............................. 123/557 |
| 4,550,706 | 11/1985 | Hoffman .......................... 123/557 |

FOREIGN PATENT DOCUMENTS

| | | |
|---|---|---|
| 1101284 | 5/1981 | Canada . |
| 0069639 | 1/1983 | European Pat. Off. . |
| 2354037 | 7/1975 | Fed. Rep. of Germany ...... 123/557 |
| 416756 | 10/1910 | France . |
| 495398 | 10/1919 | France . |
| 1214097 | 4/1960 | France . |
| 2458026 | 12/1980 | France . |

*Primary Examiner*—Tony M. Argenbright
*Attorney, Agent, or Firm*—Beveridge, De Grandi & Weilacher

[57] ABSTRACT

A device for heating fuel for engines. A block (1) has a number of bores (2) through which pass thermal transfer tubes (3, 4) whose diameter is smaller than that of the bores so as to provide annular chambers (5, 6) for the fuel to flow through. Helical bulkheads are arranged inside the chambers (5, 6) between the tubes and the walls of the bore, causing the fuel to follow a helical path around the heating tubes (3, 4).

9 Claims, 4 Drawing Figures

DEVICE FOR HEATING THE FUEL FOR DIESEL ENGINES

BACKGROUND OF THE INVENTION

Diesel engines, particularly those intended for propelling industrial vehicles, use a fuel obtained from the distillation of oil incorporating a fairly high proportion of paraffin products. At temperatures lower than 0° these products have a tendency to form paraffin crystals at a temperature known as the Trouble Point. Then at a lower temperature, generally at about −7°, the concentration and size of the crystals becomes such that filters of normal-sized mesh are blocked, which causes the engine to stop. At temperatures lower than −10° a freezing phenomenon can occur, causing seizure of the valve of the supply pump.

The invention proposes devices for heating the fuel by the transfer of external heat energy, consisting essentially of exchangers using water, electrical resistances, or an oil circuit, or a combination of these means. The invention proposes means enabling the thermal exchange to be improved by a mechanical stirring effect, which in itself already has a fluidizing effect and the thermal transfer of which enables the result obtained to be increased to such an extent that the limit of operation is lowered for example from −7° to −20° for a device having a capacity of 150 W, that is a downward offset of 13°, but it is possible to reach temperatures of −40° to −50°.

SUMMARY OF THE INVENTION

According to the invention, the heating device essentially incorporates, in a block, a central tube, for transmitting heat energy, inside a concentric bore in which the fuel circulates, the space between the two tubes defining a chamber which is made helical by the arrangement of a spiral bulkhead which imposes on the fuel a rotary path. The normal fuel flow rate is preferably chosen to be at the limit of laminar flow and turbulent flow.

In addition, when the heating device utilizes the cooling water of the heat engine, the internal tube in which it circulates is itself preferably subdivided into two equal volumes by a spiral bulkhead which enables thermal exchange between the water and the wall of the tube to be increased.

From a modular exchanger unit it is possible to combine a number of such units in honeycombs, parallel to one another, or to arrange that the circulation of the fluids is always in series. At the ends, the circulation tubes are preferably put into communication by manifolds, which are independent, firstly, for the fuel and, secondly, for the heating fluid.

BRIEF DESCRIPTION OF THE DRAWINGS

The invention is described below with reference, by way of example, to embodiments shown in the accompanying drawings and in which.

DETAILED DESCRIPTION OF PREFERRED EMBODIMENTS

Figure 1:
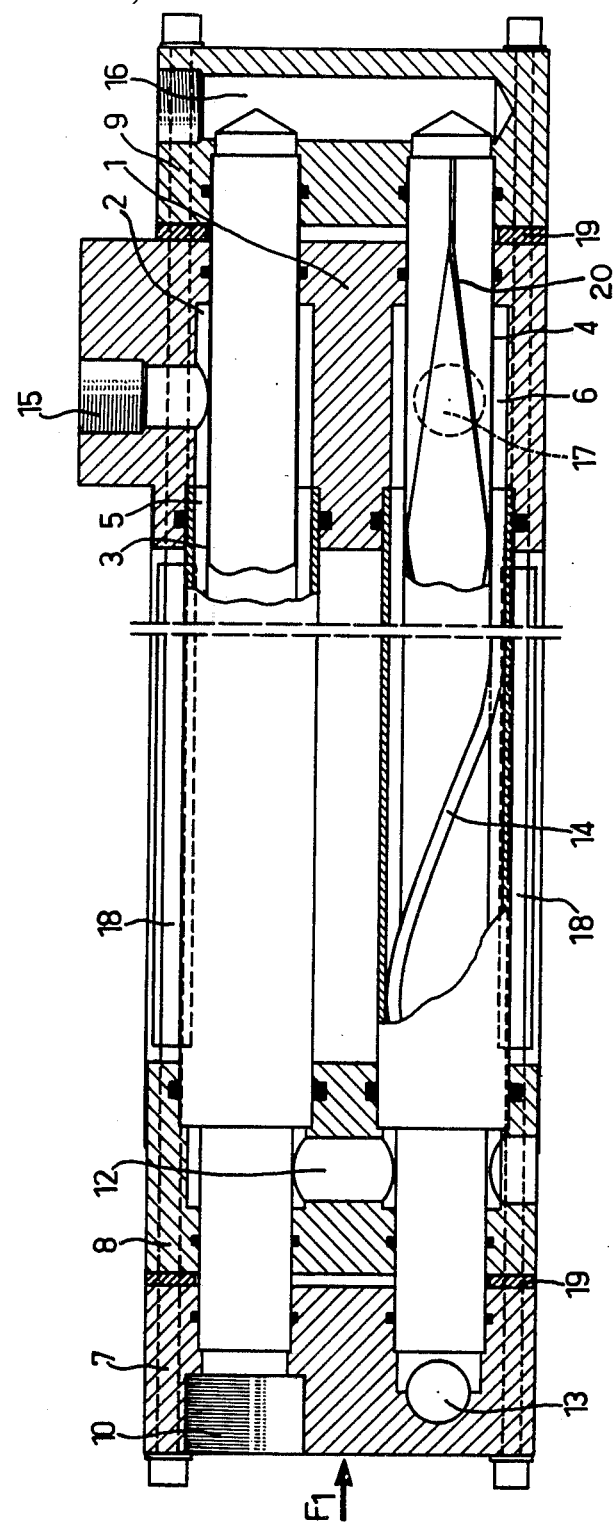
FIG. 1 is plan view partially sectioned of a heating device using water circulation.
Figure 2:
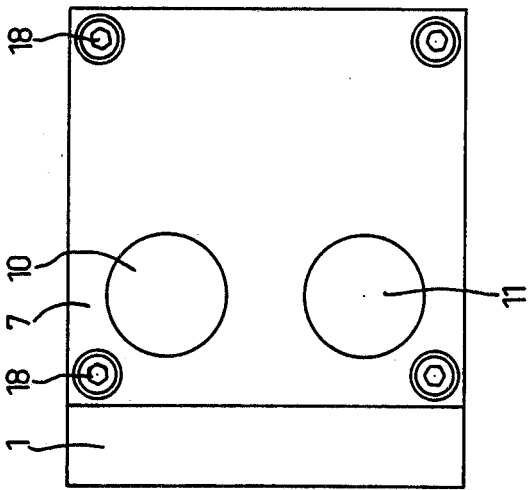
FIG. 2 is an end view in the direction of the arrow F1 shown in FIG. 1.

According to a first embodiment shown diagrammatically in FIGS. 1 and 2, the exchanger device is supplied with heat from the cooling water of the engine. It consists of a body 1 having four bores 2 one above the other, two being arranged so as to be parallel in an upper row, the other two being arranged vertically below the two first bores in a a lower row. These bores house internal concentric tubes such as tubes 3, 4 leaving a free space 5, 6 intended for the circulation of the fuel. At the ends, manifolds 7, 8, 9 have suitable holes passing through which, in the manifold 7, enable water to enter and to leave through the holes 10, 11; the manifold 8 enables the two chambers 5 and 6 of the upper row to communicate with one another for fuel to pass through, and likewise the two chambers of the lower row, through passages such as 12. The passage 13 enables water to flow towards the tube of the lower bore after having circulated in the tube 4. The manifold 9 enables water to flow at the other end from one tube of a row to the other tube of the same row.

According to one of the characteristics of the invention, each water tube is surrounded externally with a helical bulkhead 14, so that the annular chambers for fuel circulation are defined in such a way as to constrain the fuel to follow a helical path along the exchanger tubes. Lastly, a fuel inlet is provided laterally at 15, whereas the outlet takes place through a hole which is situated underneath and which communicates with the chamber of the lower row. Helical bulkheads 20 within tubes 3, 4 cause the water to follow a spiral path within the tubes.

In this way, the water coming from the cooling circuit of the engine enters the block through the inlet 10, passes through the tube 3 to the opposite manifold 9 where it passes through the passage 16 to the adjoining tube 4, and passes through the tube 4 to the passage 13 through which it reaches the lower tube where it follows a similar path at the lower level, so as to leave through the outlet 11.

For its part, the fuel arriving through the inlet 15 circulates helically in the chamber 5 around the tube 3. It reaches the manifold 8 where, through the passage 12, it arrives in the adjoining chamber 6 where it circulates helically as far as a passage 17, where it flows into the chamber situated immediately below. From there it returns towards the manifold 8 and, through a passage similar to the passage 12, it flows into an adjoining chamber where it circulates helically so as to reach an outlet situated vertically below the inlet 15.

Suitably spaced Teflon seals provide perfect sealing over a wide range of temperatures. The body 1 and the different manifolds are assembled by means of tie rods 18 and nuts. Spacing plates 19 are inserted between the manifolds and the body and between the manifolds themselves, so that in the case of damage the water is prevented from mixing with the fuel.

In such a device, heating by convection and stirring due to the helical circulation co-operate so as to allow faster and more efficient exchange.

It is of course understood that at the same time the circulation pumps and the filters are arranged to provide sufficient circulation during the time required to heat the cooling water to the required temperature.

Figure 4:
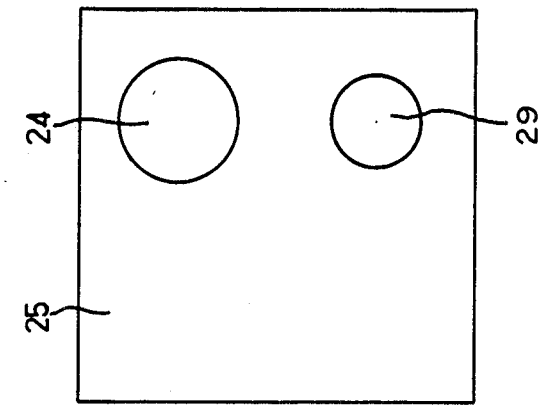
FIG. 4 is an end view in elevation in the direction of the arrow F3 shown in FIG. 3.
Figure 3:
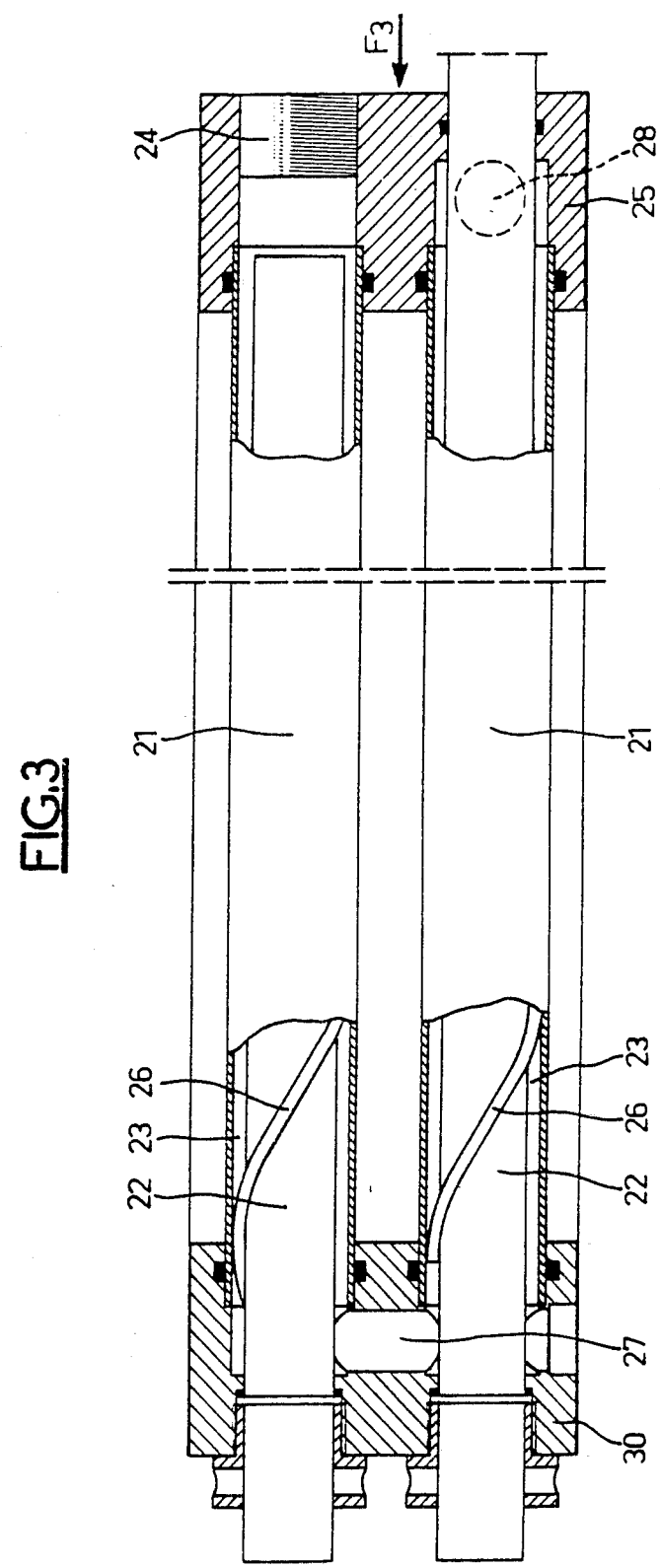
FIG. 3 is a plan view in partial section of a device for mixed heating by electricity and water circulation.

When sufficient electrical energy is available, heating can be obtained at least partially from electrical resistances. Such a mixed device is shown in FIGS. 3 and 4.

The general arrangement is the same as for the device described above, but two water tubes have been replaced by armoured electrical resistances 21, situated in two bores above one another. The two other bores have water tubes 22 passing through them.

The annular chambers 23 formed between the bores and the water tubes or the resistances form passages for the fuel, which enters the device at one end through an inlet 24 in the manifold 25.

As in the previous example, the chambers between the water tubes and the resistances are provided with helical windings 26 which completely close the annular passage and thus cause the fuel to circulate along a helical path, which causes stirring at the same time as turbulence in the flow.

After having entered at inlet 24, the fuel circulates along the electrical resistance 21, then flows through the passage 27 so as to enter the passage surrounding the water tube as far as the other end where, through a passage 28 in the manifold 25, it descends into the lower bore then returns through the second lower bore to an outlet 29 situated below the inlet 24.

The water tubes which pass through the end manifolds 25 and 30 from one side to the other are separately connected to inlet and outlet passages which are not shown.

It is also possible to achieve heat transfer by electrical resistances alone. Such a device is easily derived from the previous example and does not require a special description.

I claim:

1. A device for heating fuel for a Diesel engine comprising a main block having a plurality of bores therein; a like plurality of thermal transfer tubes within the bores, said transfer tubes having a diameter smaller than the diameter of the bores so as to define chambers for fuel to flow through; a plurality of helical bulkheads within the chambers, between the tubes and the walls of the bores, and arranged to cause the fuel to follow a helical path around the thermal transfer tubes; a plurality of manifolds on the end surfaces of the main block, at the ends of the bores, the manifolds having passages therein respectively forming inlets and outlets for fuel and for a heat transfer medium, and permitting the fuel to flow from one bore to another and the heat transfer medium to flow from one tube to another, and a plurality of stepped bores and seal members for receiving, in tight and free sliding relation, end portions of the thermal transfer tubes while permitting sliding thereof on expansion due to heating.

2. A device according to claim 1 adapted for use with a Diesel engine having means for circulating a cooling fluid to cool the engine, the device further comprising means for passing cooling fluid from the engine through the thermal transfer tubes to heat the tubes.

3. A device according to claim 2 further comprising:
a plurality of end blocks adjacent the manifolds and having bores therein and seal members providing tight connections between the end blocks and the main block while permitting free sliding movement of the thermal transfer tubes due to heating of the tubes; and
spacer means for spacing the end blocks from the corresponding manifolds;
whereby accidental mixing of cooling fluid and fuel is avoided.

4. A device according to claim 2 further comprising a further plurality of helical bulkheads within the thermal transfer tubes and arranged to cause cooling fluid to follow a helical path through the thermal transfer tubes.

5. A device according to claim 1 in which the heating tubes are armoured electrical resistances.

6. A device according to claim 1 adapted for use with a Diesel engine having means for circulating a cooling fluid to cool the engine, the device further comprising means for passing cooling fluid from the engine through at least a first part of the thermal transfer tubes to heat the first part and in which at least a second part of the thermal transfer tubes are armoured electrical resistances.

7. A device according to claim 6 further comprising:
a plurality of end blocks adjacent the manifolds and having bores therein and seal members providing tight connections between the end blocks and the main block while permitting free sliding movement of the thermal transfer tubes due to heating of the tubes; and
spacer means for spacing the end blocks from the corresponding manifolds;
whereby accidental mixing of cooling fluid and fuel is avoided.

8. A device according to claim 6 further comprising further plurality of helical bulkheads within the thermal transfer tubes and arranged to cause cooling fluid to follow a helical path through the thermal transfer tubes.

9. A device according to claim 1 further comprising a plurality of tie rod members for mechanically securing the device together in a fluid tight manner while permitting axial movement on thermal expansion.

* * * * *